United States Patent
Rooks et al.

(10) Patent No.: US 8,719,414 B2
(45) Date of Patent: *May 6, 2014

(54) MULTI-SOURCE BROADBAND AGGREGATION ROUTER

(75) Inventors: Kelsyn D. S. Rooks, Overland Park, KS (US); William T. Stelle, Lenexa, KS (US); Jeffrey M. Sweeney, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 33 days.

This patent is subject to a terminal disclaimer.

(21) Appl. No.: 12/464,477

(22) Filed: May 12, 2009

(65) Prior Publication Data

US 2010/0293277 A1   Nov. 18, 2010

(51) Int. Cl.
   *G06F 15/173* (2006.01)
(52) U.S. Cl.
   USPC ............ 709/226; 709/223; 709/224; 709/225
(58) Field of Classification Search
   USPC ....................................................... 709/226
   See application file for complete search history.

(56) References Cited

U.S. PATENT DOCUMENTS

| | | | |
|---|---|---|---|
| 5,959,968 A | 9/1999 | Chin et al. | |
| 5,995,518 A | 11/1999 | Burns et al. | |
| 6,473,424 B1 | 10/2002 | DeJager et al. | |
| 6,667,975 B1 * | 12/2003 | DeJager et al. | 370/389 |
| 7,383,353 B2 * | 6/2008 | Valdevit et al. | 709/241 |
| 7,653,071 B1 * | 1/2010 | Pannell et al. | 370/401 |
| 7,805,156 B1 * | 9/2010 | Allen et al. | 455/550.1 |
| 8,665,783 B2 | 3/2014 | Stelle et al. | |
| 2003/0046396 A1 * | 3/2003 | Richter et al. | 709/226 |
| 2004/0001512 A1 * | 1/2004 | Challener et al. | 370/468 |
| 2004/0024906 A1 * | 2/2004 | Valdevit et al. | 709/241 |
| 2004/0039834 A1 * | 2/2004 | Saunders et al. | 709/231 |
| 2006/0072543 A1 * | 4/2006 | Lloyd et al. | 370/351 |
| 2007/0064901 A1 * | 3/2007 | Baird et al. | 379/202.01 |
| 2007/0180119 A1 * | 8/2007 | Khivesara et al. | 709/226 |
| 2008/0250478 A1 * | 10/2008 | Miller et al. | 726/5 |

(Continued)

OTHER PUBLICATIONS

U.S. Appl. No. 12/469,183; Non Final Office Action dated Oct. 4, 2011; 14 pages.

(Continued)

*Primary Examiner* — Rupal Dharia
*Assistant Examiner* — Mohammed Ahmed
(74) *Attorney, Agent, or Firm* — Swanson & Bratschun, L.L.C.

(57) ABSTRACT

A router has one or more wired connections to a remote computer network and one or more wireless connections to the remote computer network for managing a plurality of data routes between computers of a local area network and the remote computer network. In optimizing multi-broadband sources for the local computer network, the router determines an aggregate bandwidth of the data routes and segregates the aggregate bandwidth into two or more independent bandwidth routes for selective allocation of one of the bandwidth routes to each data exchange between the local computer network and the remote computer network. The bandwidth routes may be distinguished based on the differing types of connections of the router and the remote computer network, the differing types of connections of the router and the plurality of the computers, the varying latency of the data routes, the directional flows of data along the data routes, the security level of the data exchange between the computers and the remote data network, and the security level of the connections between the router and the remote data network.

18 Claims, 4 Drawing Sheets

(56) References Cited

U.S. PATENT DOCUMENTS

| | | | |
|---|---|---|---|
| 2008/0259841 A1* | 10/2008 | Deshpande | 370/328 |
| 2009/0168701 A1* | 7/2009 | White et al. | 370/328 |
| 2010/0177896 A1* | 7/2010 | Walter et al. | 380/270 |
| 2010/0188990 A1* | 7/2010 | Raleigh | 370/252 |
| 2010/0296437 A1 | 11/2010 | Stelle et al. | |

OTHER PUBLICATIONS

U.S. Appl. No. 12/469,183; Non-Final Rejection dated Mar. 29, 2012; 22 pages.

U.S. Appl. No. 12/469,183; Final Rejection dated Oct. 26, 2012; 21 pages.

U.S. Appl. No. 12/469,183; Non-Final Rejection dated Feb. 15, 2013; 22 pages.

U.S. Appl. No. 12/469,183; Advisory Action dated Sep. 11, 2013; 4 pages.

U.S. Appl. No. 12/469,183; Final Rejection dated Jun. 21, 2013; 22 pages.

U.S. Appl. No. 12/469,183; Notice of Allowance dated Oct. 17, 2013; 20 pages.

U.S. Appl. No. 12/469,183; Issue Notification dated Feb. 12, 2014; 1 page.

* cited by examiner

MULTI-SOURCE BROADBAND AGGREGATION ROUTER

TECHNICAL FIELD OF THE INVENTION

The present invention generally relates to routers. The present invention specifically relates to creating an optimal aggregate bandwidth by a router from multiple broadband sources within a local computer network.

BACKGROUND OF THE INVENTION

A router is a device that forwards data packets between computer networks, and the amount of information per unit of time that can be exchanged between the router and another device is generally known as bandwidth. For example, in the context of a home or a business, a router may be utilized to forward data packets between a local computer and the Internet at a specified broadband transmission.

Multiple bandwidth sources of varying types may exist within a local computer network at any given time. In particular, a mobile phone may be added ad hoc to the local computer network and the router can aggregate all of its connected devices, wired and wireless, into a single bandwidth route to a remote computer network. The routing industry is striving to provide new and unique techniques for optimizing such aggregate bandwidth.

SUMMARY OF THE INVENTION

In one disclosed embodiment, a local computer network employing a plurality of computers, and a router having one or more wired connections to a remote computer network and one or more wireless connections to the remote computer network is disclosed. These connections provide for a plurality of data routes between the local computers and the remote computer network that are managed by the router. In optimizing multi-broadband sources for the local computer network, the router determines an aggregate bandwidth of the data routes, and segregates the aggregate bandwidth into two or more independent bandwidth routes for selective allocation of one of the bandwidth routes to each data exchange between one of the local computers and the remote computer network. The bandwidth routes may be distinguished based on the differing types of connections of the router and the remote computer network, the differing types of connections of the router and the local computers, the varying latency of the data routes, the directional flows of data along the data routes, the security level of the data exchange between the local computers and the remote data network, and the security level of the connections between the router and the remote data network.

In another disclosed embodiment, a method of operating a router within a local computer network is disclosed. The method involves the router being connected to a remote compute network for managing a plurality of data routes between a plurality of local computers and the remote computer network. In optimizing multi-broadband sources for the local computer network, the method further involves the router determining an aggregate bandwidth of the data routes and segregating the aggregate bandwidth into two or more independent bandwidth routes for selective allocation of one of the bandwidth routes to each data exchange between one of the local computers and the remote computer network. Again, the bandwidth routes may be distinguished based on the differing types of connections of the router and the remote computer network, the differing types of connections of the router and the plurality of the local computers, the varying latency of the data routes, the directional flows of data along the data routes, the security level of the data exchange between the local computers and the remote data network, and the security level of the connections between the router and the remote data network.

The foregoing embodiments and other embodiments of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

Figure 1:
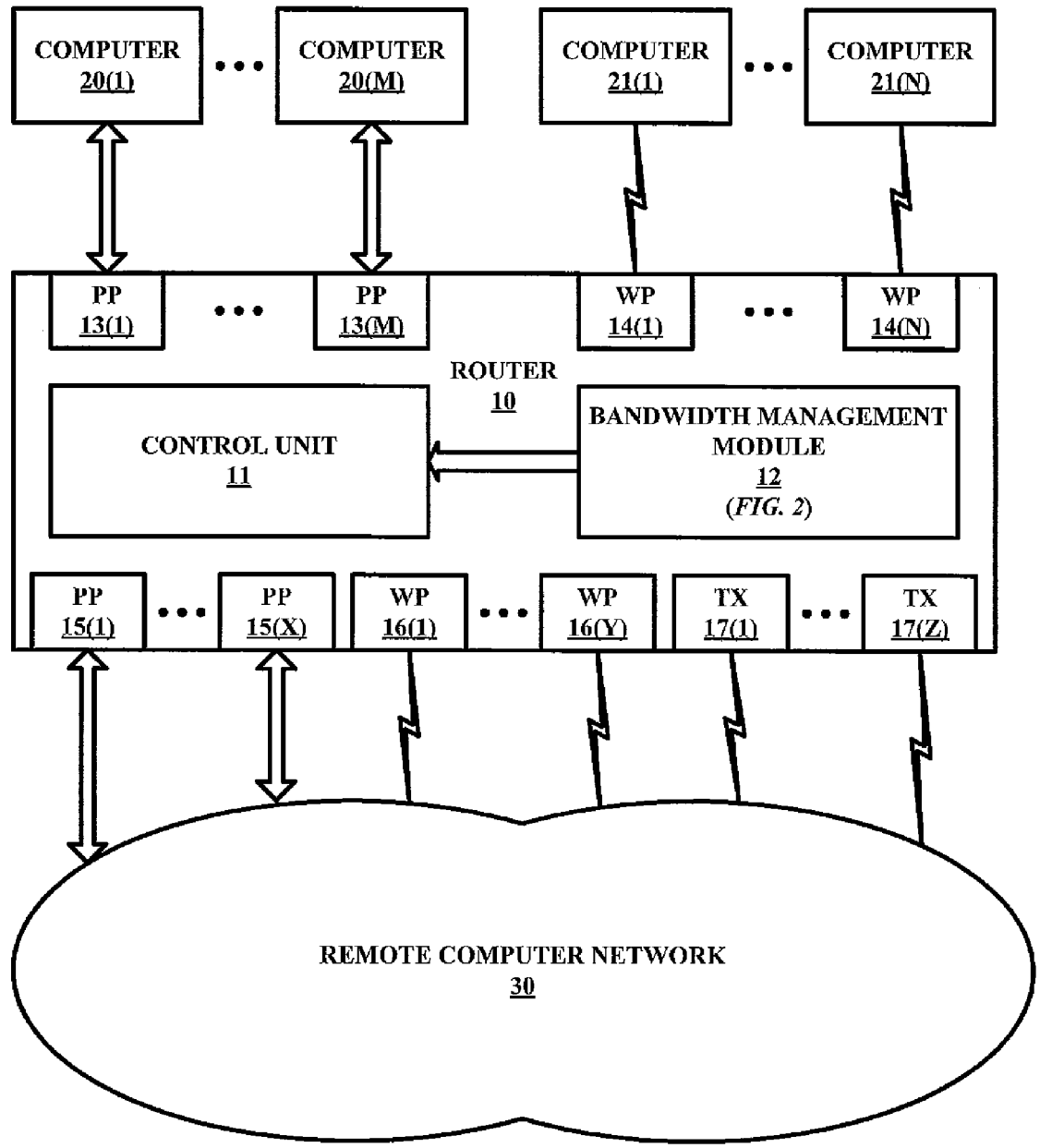
FIG. 1 illustrates a block diagram of an exemplary embodiment of a network environment in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated devices and methods, and further applications of the principles of the invention as illustrated therein are herein contemplated as would normally occur to one skilled in the art to which the invention relates.

A router according to the presently disclosed embodiments incorporates common router features (e.g., routing tables, rules, protocols, firewalls, port forwarding, etc.) with a novel routing scheme involving an intelligent bandwidth segregation of multiple data routes between a local computer network (e.g., a local area network or a wide area network) of which the router is a part, and a remote computer network (e.g., a local area network or a wide area network) to which the router is remotely connected. In particular, the router combines all the available bandwidth from multiple connections to the remote computer network, segregates the aggregate bandwidth into two or more independent bandwidth routes, and allows access by the local computer network to the remote computer network on a selective allocation of one of the bandwidth routes. The following description of an exemplary router 10 of the present invention as shown in FIG. 1 and an exemplary routing method 40 of the present invention as shown in FIG. 2 will facilitate further understanding of the present invention.

Specifically, FIG. 1 illustrates router 10 having an M number of physical ports 13 for wired connections to an M number of computers 20 (e.g., desktops or servers), where M≥1, and an N number of wireless ports 14 for wireless connections to an N number of computers 21 (e.g., laptops), where N≥1. Alternatively, a portion or all of the wired and wireless connections may be to another computer network (e.g., an Ethernet). Additionally, router 10 has an X number of physical ports 15 for wired connections to a remote computer network 30 (e.g., a DSL connection, a cable connection, a T1 connection, an OC3 connection, a fiber connection, an Ethernet connection, or a USB connection to a cellular device), where X≥1, a Y number of wireless ports 16 for wireless connections to remote computer network 30 (e.g., a CDMA AirCard, an EVDO AirCard, a 3G AirCard, a WiMax access device, an LTE wireless device or a wireless conection to a cellular device), where Y≥1, and a Z number of transceivers 17 for wireless connections to remote computer network 30, where Z≥1.

In operation, router 10 implements a control unit 11 structurally configured to implement common router features (e.g., routing tables, rules, protocols, firewalls, port forwarding, etc.). A bandwidth management module 12 is incorporated in router 10, either within control unit 11 or working in conjunction with control unit 11, to execute flowchart 40 (FIG. 2) for the intelligent segregation of an aggregate bandwidth of multiple data routes between local computers 20, 21 and remote computer network 30.

Figure 2:
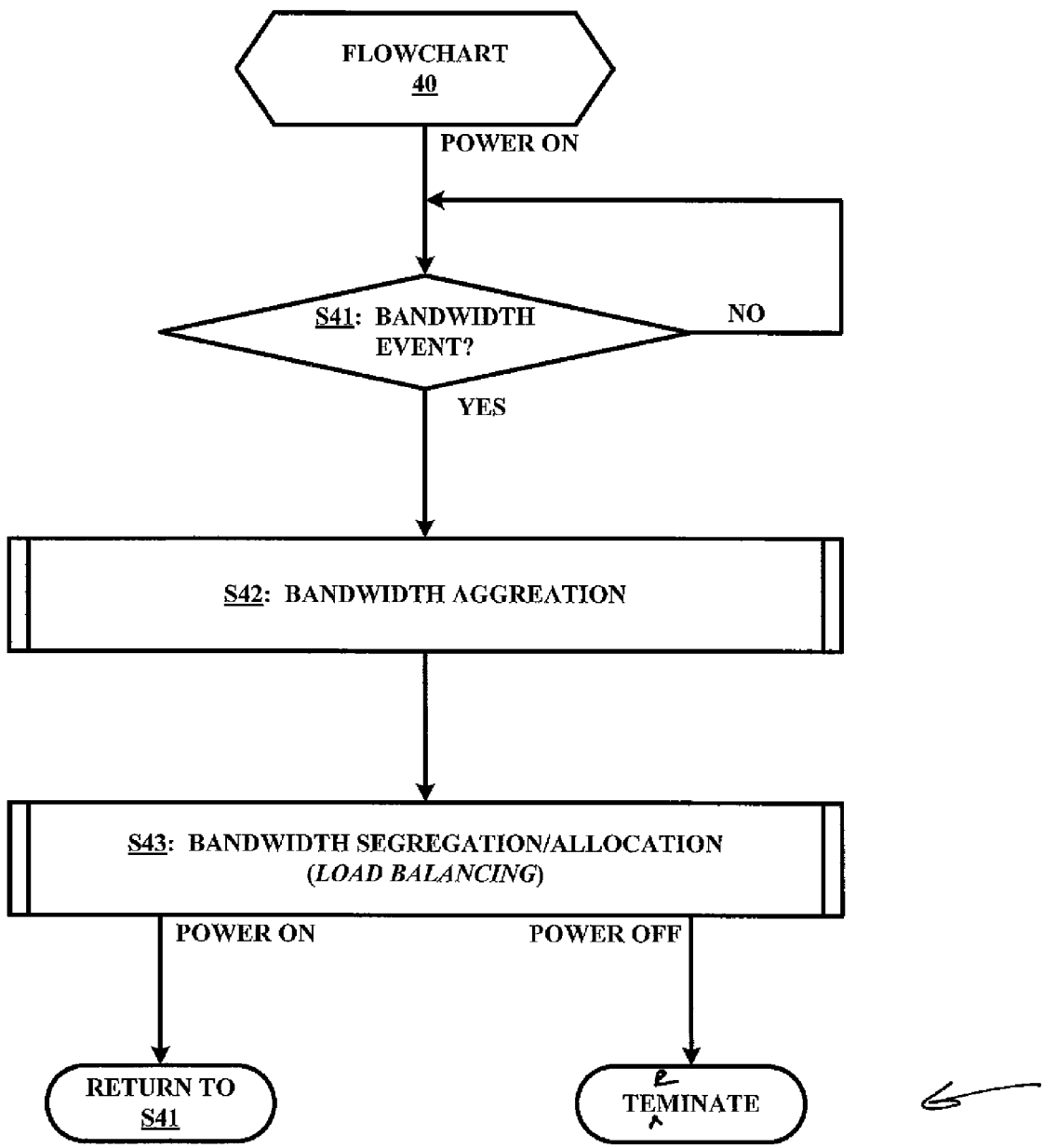
FIG. 2 illustrates a flowchart representative of an aggregate bandwidth method of the present invention.

Specifically, as shown in FIG. 2, module 12 during a stage S41 of flowchart 40 determines if a new connection between router 10 and remote computer network 30 has been established, if an existing connection between router 10 and remote computer network 30 has been terminated or if a bandwidth availability status of an existing connection between router 10 and remote computer network 30 has changed (collectively a "bandwidth event"). Upon making such a determination, module 12 proceeds to a stage S42 of flowchart 40 to determine an aggregate bandwidth of all of the data routes between local computers 20, 21 and remote computer network 30 (in some embodiments, module 12 aggregates multiple, but not all, available data routes). The aggregate bandwidth increases for a bandwidth event where a new connection between router 10 and remote computer network 30 has been established, and conversely decreases for a bandwidth event where an existing connection between router 10 and remote computer network 30 has been terminated. Furthermore, the aggregate bandwidth is adjusted for a bandwidth event where the bandwidth availability of connection between router 10 and remote computer network 30 has changed.

Upon determining an aggregate bandwidth, module 12 proceeds to a stage S43 of flowchart 40 to segregate the aggregate bandwidth into two or more independent bandwidth routes for the selective allocation of one of the bandwidth routes to each data exchange between local computers 20, 21 and remote computer network 30. The segregation of the aggregate bandwidth by module 12 is based on one or more predetermined routing parameters that provide for an intelligent use of the aggregate bandwidth. Furthermore, a load balancing technique may be implemented for each bandwidth including multiple connections to remote computer network 30. A more detailed explanation of stage S41 will now be provided herein with reference to FIG. 3 and FIG. 4.

Figure 3:
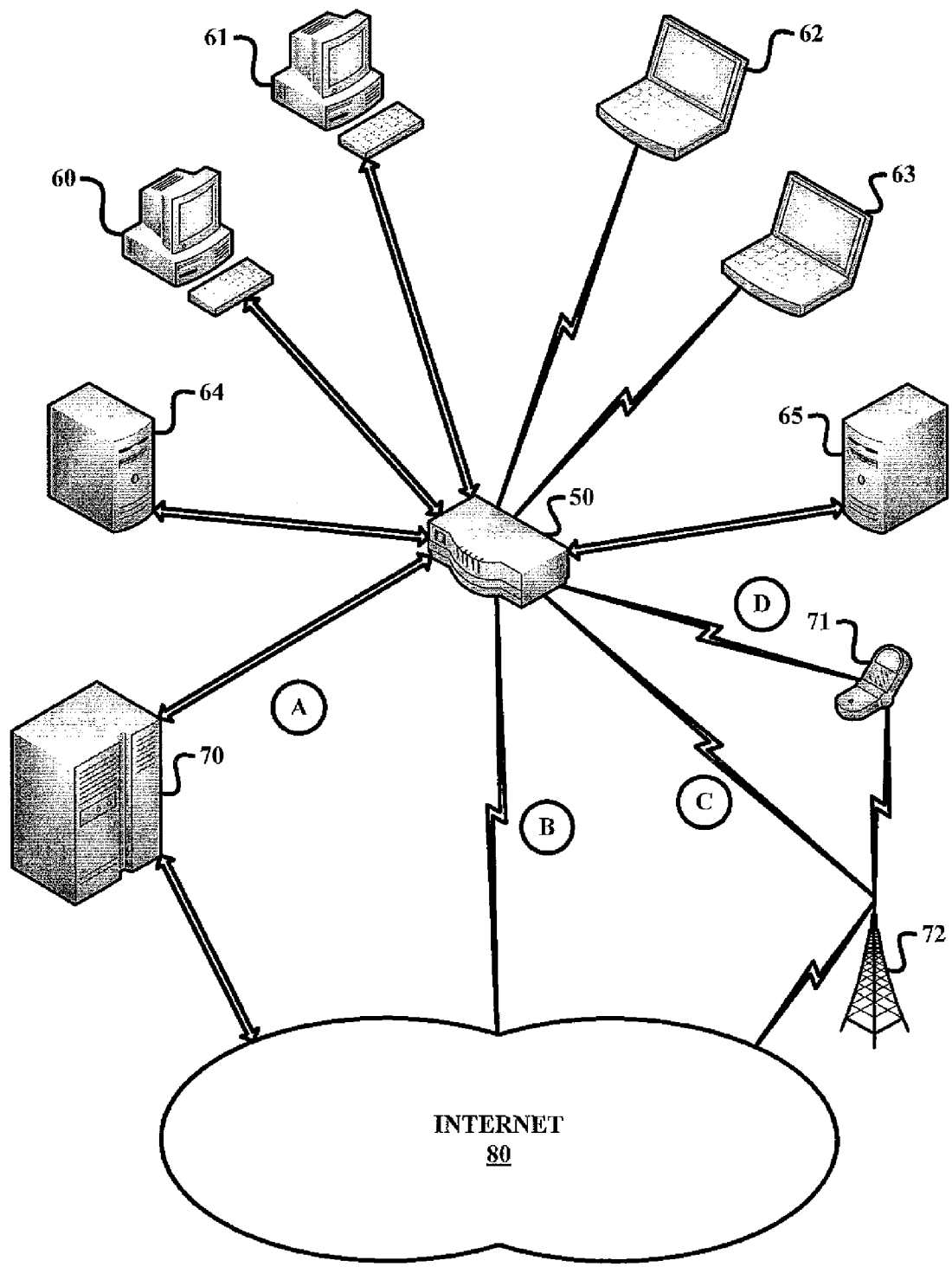
FIG. 3 illustrates a schematic diagram of a first exemplary embodiment of the network environment shown in FIG. 1 in accordance with the present invention.
Figure 4:
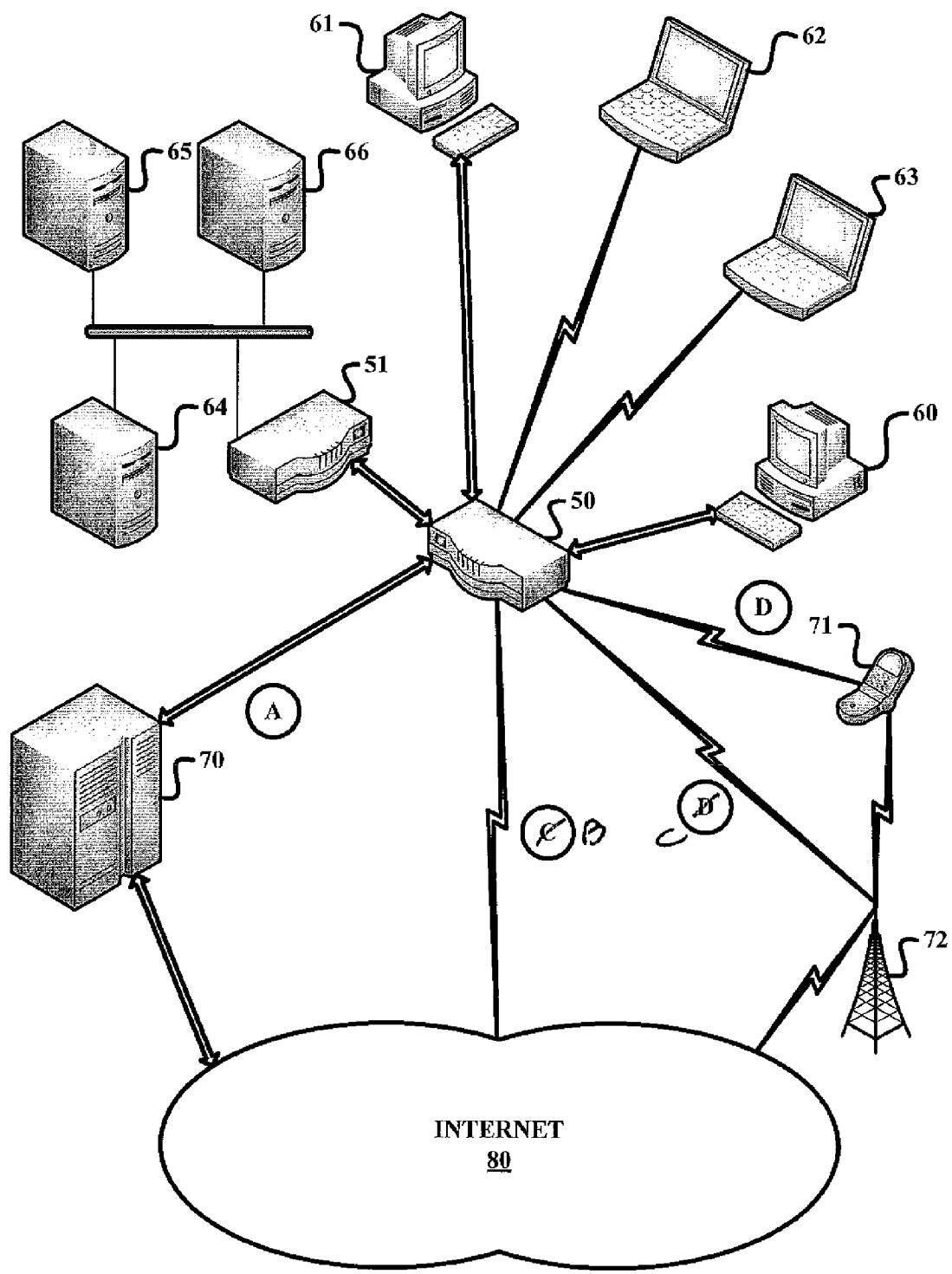
FIG. 4 illustrates a schematic diagram of a second exemplary embodiment of the network environment shown in FIG. 1 in accordance with the present invention.

Specifically, FIG. 3 illustrates a router 50 (having the same architecture as router 10) having wired connections to desktops 60 and 61, servers 64 and 65, and wireless connections to laptops 62 and 63. In an alternative embodiment, FIG. 4 illustrates servers 64-66 having a wired connection to a router 51, which has a router connection to router 50. Additionally, FIGS. 3 and 4 illustrate a wired connection to Internet 80 via an Internet service provider 70 having a bandwidth A, a wireless connection to Internet 80 via a transceiver of router 50 having a bandwidth B, a wireless connection to Internet 80 via an AirCard of router 50 and a wireless network 72 having a bandwidth C, and a wireless connection to Internet 80 via a cellular phone 71 and wireless network 72 having a bandwidth D. These connections have an aggregate bandwidth A-D.

Referring to FIGS. 3 and 4, one routing parameter that may be utilized by module 12 in segregating aggregate bandwidth A-D may be the type of connection between router 50 and Internet 80. For example, module 12 may segregate the aggregate bandwidth A-D into a wired bandwidth route A for the wired connection between router 50 and Internet 80, and a wireless bandwidth route B-D for the wireless connections between router 50 and Internet 80. A load balancing technique may be implemented for wireless bandwidth route B-D.

Another routing parameter that may be utilized by module 12 in segregating aggregate bandwidth A-D may be the type of connection between router 50 and the local computers. For example, as shown in FIG. 3, module 12 may segregate the aggregate bandwidth A-D into a wired bandwidth route A for the wired connections between router 50 and computers 60, 61, 64 and 65, and a wireless bandwidth route B-D for the wireless connections between router 50 and computers 62 and 63. Also by example, as shown in FIG. 4, module 12 may segregate the aggregate bandwidth A-D into a wired bandwidth route A for the wired connections between router 50 and computers 60, 61 and router 51, and a wireless bandwidth route B-D for the wireless connections between router 50 and computers 62 and 63.

Another routing parameter that may be utilized by module 12 in segregating aggregate bandwidth A-D may be the mode of connection between router 50 and the computers. For example, as shown in FIG. 4, module 12 may segregate the aggregate bandwidth A-D into a direct bandwidth route A for the direct connections between router 50 and computers 60-63, and a switch bandwidth route B-D for the wireless connections between router 50 and router 51.

Another routing parameter that may be utilized by module 12 in segregating aggregate bandwidth A-D may be the latency of the data routes. For example, module 12 may segregate the aggregate bandwidth A-D into a low latency bandwidth route A for each data exchange of video, audio and/or images between router 50 and Internet 80, and a high latency bandwidth route B-D for each data exchange of text and/or database data between router 50 and Internet 80.

Another routing parameter that may be utilized by module 12 in segregating aggregate bandwidth A-D may be the directional flow of data between router 50 and Internet 80. For example, module 12 may segregate the aggregate bandwidth A-D into an upstream bandwidth route A for upstream data exchange from router 50 to Internet 80, and a downstream bandwidth route B-D for each downstream data exchange from Internet 80 to router 50.

Another routing parameter that may be utilized by module 12 in segregating aggregate bandwidth A-D may be the desired security level of the data exchange between router 50 and Internet 80. For example, module 12 may segregate the aggregate bandwidth A-D into a bandwidth route A-B for secure data exchange between router 50 and Internet 80, and a bandwidth route C-D for each unsecure data exchange between router 50 and Internet 80.

Another routing parameter that may be utilized by module 12 in segregating aggregate bandwidth A-D may be the security level of each connection between router 50 and Internet 80. For example, module 12 may segregate the aggregate bandwidth A-D into a bandwidth route A-B for secure connections between router 50 and Internet 80, and a bandwidth route C-D for unsecure connections between router 50 and Internet 80.

Referring again to FIG. 2, module 11 will continually execute stages S41-43 of flowchart 40 until such time router 11 is powered off. In practice, module 11 may be implemented hardware, firmware and/or software as would be appreciated by those having ordinary skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A local computer network, comprising:
  a plurality of local computers at a home or business; and
  a multi-broadband router located at the home or business, the router operatively coupled to the plurality of local computers and having at least two connections to a remote computer network for managing a plurality of data routes between the local computers and a remote computer network,
  wherein the router determines that a bandwidth event has occurred, the bandwidth event comprising establishment of a new connection between the router and the remote computer network, termination of an existing connection between the router and the remote computer network, or a change in a bandwidth availability status of an existing connection between the router and the remote computer network,
  determines an aggregate bandwidth of the data routes, based on determining that a bandwidth event has occurred, and segregates the aggregate bandwidth into at least two independent bandwidth routes for selective allocation of one of the bandwidth routes to each data exchange between the plurality of computers and the remote computer network, wherein load balancing is implemented for each of the at least two independent bandwidth routes, the at least two independent bandwidth routes comprising:
  a secure bandwidth route comprising a first set of one or more secure connections between the router at the home or business and the remote computer network for secure data exchange; and
  an unsecured bandwidth route comprising a set of one or more unsecured connections between the router at the home or business and the remote computer network for unsecured data exchange; and wherein the at least two independent bandwidth routes further include:
  a direct bandwidth route including each direct connection between the router and the plurality of computers; and
  a switch bandwidth route including each switch connection between the router and the plurality of computers.

2. The local computer network of claim 1, wherein the at least two independent bandwidth routes include:
  a wired bandwidth route including each wired connection between the router and the remote computer network; and
  a wireless bandwidth route including each wireless connection between the router and the remote computer network.

3. The local computer network of claim 1, wherein the at least two independent bandwidth routes include:
  a wired bandwidth route including each wired connection between the router and the plurality of computers; and
  a wireless bandwidth route including each wireless connection between the router and the plurality of computers.

4. The local computer network of claim 1, wherein the at least two independent bandwidth routes include:
  a low latency bandwidth route for each data exchange of a first type of data packet between the local computer network and the remote computer network; and
  a high latency bandwidth route for each data exchange of a second type of data packet between the local computer network and the remote computer.

5. The local computer network of claim 4,
  wherein the first type of data packet includes at least one of text and database data; and
  wherein the second type of data packet includes at least one of audio, video and images.

6. The local computer network of claim 1, wherein the at least two independent bandwidth routes include:
  an upstream bandwidth route for each upstream data communication from the router to the remote computer network; and
  a downstream bandwidth route for each downstream data communication from the remote computer network to the router.

7. The local computer network of claim 1, wherein the at least two independent bandwidth routes include:
  a secure bandwidth route for each secure data exchange between the local computer network and the remote computer network; and
  an unsecured bandwidth route for each unsecured data exchange between the local computer network and the remote computer network.

8. The local computer network of claim 1, wherein the at least two independent bandwidth routes include:
  a secure bandwidth route for each secure connection between the router and the remote computer network; and
  an unsecured bandwidth route for each unsecured connection between the router and the remote computer network.

9. The local computer network of claim 1, wherein the at least two connections of the router to the remote computer network include:
  at least one wired connection the router to the remote computer network; and
  at least one wireless connection of the router to the remote computer network.

10. A method of operating a multi-broadband router, the method comprising:
  connecting the multi-broadband router to a remote computer network for managing a plurality of data routes between the router and a remote computer network, wherein the router is located at a home or business and is operatively coupled to a plurality of local computers at the home or business; and
  operating the router to determine that a bandwidth event has occurred, the bandwidth event comprising establishment of a new connection between the router and the remote computer network, termination of an existing connection between the router and the remote computer network, or a change in a bandwidth availability status of an existing connection between the router and the remote computer network,
  to determine an aggregate bandwidth of the data routes and to segregate the aggregate bandwidth into at least two independent bandwidth routes for selective allocation of one of the bandwidth routes to each data exchange between the local computer network and the remote computer network, wherein load balancing is implemented for each of the at least two independent bandwidth routes, wherein the at least two independent bandwidth routes comprise:
- a secure bandwidth route comprising a first set of one or more secure connections between the router at the home or business and the remote computer network for secure data exchange; and
- an unsecured bandwidth route comprising a set of one or more unsecured connections between the router at the home or business and the remote computer network for unsecured data exchange; and
- wherein the at least two independent bandwidth routes further include:
- a direct bandwidth route including each direct connection between the router and the plurality of computers; and
- a switch bandwidth route including each switch connection between the router and the plurality of computers.

11. The method of claim 10, wherein the at least two independent bandwidth routes include:
- a wired bandwidth route including each wired connection between the router and the remote computer network; and
- a wireless bandwidth route including each wireless connection between the router and the remote computer network.

12. The method of claim 10, wherein the at least two independent bandwidth routes include:
- a wired bandwidth route including each wired connection between the router and the plurality of computers; and
- a wireless bandwidth route for each wireless connection between the router and the plurality of computers.

13. The method of claim 10, wherein the at least two independent bandwidth routes include:
- a low latency bandwidth route for each data exchange of a first type of data packet between the local computer network and the remote computer network; and
- a high latency bandwidth route for each data exchange of a second type of data packet between the local computer network and the remote computer network.

14. The method of claim 13,
- wherein the first type of data packet includes at least one of text and database data; and
- wherein the second type of data packet includes at least one of audio, video and images.

15. The method of claim 10, wherein the at least two independent bandwidth routes include:
- an upstream bandwidth route for each upstream data communication from the router to the remote computer network; and
- a downstream bandwidth route for each downstream data communication from the remote computer network to the router.

16. The method of claim 10, wherein the at least two independent bandwidth routes include:
- a secure bandwidth route for each secure data exchange between the local computer network and the remote computer network; and
- an unsecured bandwidth route for each unsecured data exchange between the local computer network and the remote computer network.

17. The method of claim 10, wherein the at least two independent bandwidth routes include:
- a secure bandwidth route for each secure connection between the router and the remote computer network; and
- an unsecured bandwidth route for each unsecured connection between the router and the remote computer network.

18. The method of claim 10, wherein the connection between the router to the remote computer network includes:
- at least one wired connection the router to the remote computer network; and
- at least one wireless connection of the router to the remote computer network.

* * * * *